(No Model.)
W. E. NICKERSON.
INCANDESCENT ELECTRIC LAMP.
No. 501,531. Patented July 18, 1893.
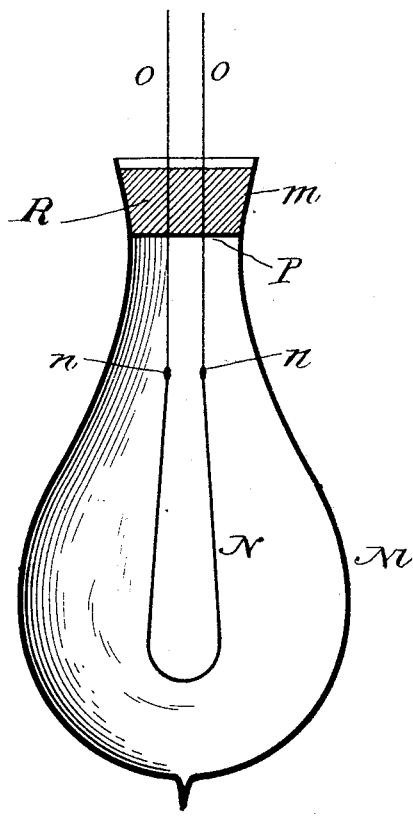
WITNESSES
Frank G. Parker.
Frank G. Hattie.
INVENTOR
William Emery Nickerson

UNITED STATES PATENT OFFICE.

WILLIAM EMERY NICKERSON, OF CAMBRIDGE, MASSACHUSETTS.

INCANDESCENT ELECTRIC LAMP.

SPECIFICATION forming part of Letters Patent No. 501,531, dated July 18, 1893.

Application filed April 6, 1893. Serial No. 469,286. (No model.)

*To all whom it may concern:*

Be it known that I, WILLIAM EMERY NICKERSON, of Cambridge, in the county of Middlesex and State of Massachusetts, have invented a new and useful Improvement in Incandescent Electric Lamps, of which the following, taken in connection with the accompanying drawing, is a specification.

My invention relates to incandescent electric lamps of that class in which the vacuum chamber is not of continuous glass with leading-in wires sealed therein, but in which the neck of the lamp is rendered air tight by means of a fusible cement.

My invention consists in closing the neck of an incandescent lamp globe air tight by means of a fusible cement which has been freed from volatile matter, which if present in the cement, would injure the vacuum when subjected to the heat and other conditions occurring in an operating lamp.

The accompanying drawing illustrates a form of incandescent lamp in which my improved fusible cement may be used.

M is the glass globe of the lamp having a conical neck *m*.

N is the filament attached at *n n* to the leading-in wires O O.

P is a disk of mica or other suitable material of such a diameter as to fit into the conical neck of the lamp globe as shown. This disk serves to support the leading-in wires O O during the process of manufacturing, and also as a floor upon which the fusible cement R may be poured when in the melted state.

A fusible cement for the purpose of closing the necks of incandescent lamps may be prepared from resins, fossil or otherwise, from rubber and other substances and mixtures of substances whose melting points are sufficiently high to resist without fusion the ordinary temperature of the neck of a properly constructed incandescent lamp. The component parts of such a fusible cement must consist of materials which in their essential substance are, not volatile at, or decomposable by the temperature attained in the neck of such a lamp. All the bodies which are adapted for fusible cements, however, contain as they occur in commerce, a greater or less quantity (as impurities or otherwise) of volatile matter and substances which are eliminated and become gaseous when cements composed of them are subjected to the action of the heat and vacuum of an incandescent lamp. The presence of these gases in the lamp is very injurious to the filament and soon causes its surface to become abraded and blackened and its illuminating power to decline.

I subject the fusible cement to be used in incandescent electric lamps, to the action of a vacuum or reduced atmospheric pressure and heat, whereby all matter which would be volatile under the conditions which obtain in an operating lamp are eliminated, and the impairment of the vacuum and consequently the filament so prevented. This elimination or reduction I accomplish in a vacuum pan which may be heated by gas flames and which is interiorly connected with a vacuum pump. In this apparatus I keep the cement in thorough fusion and exposed to the reducing action of a vacuum until it ceases to give off matter which is volatile under the diminished pressure and at such a temperature. As this temperature is much higher than that occurring in the necks of properly constructed operating lamps, the cement is so far reduced that all danger of further elimination of vapor when in use in the lamps is avoided. It may be determined when volatile matter has ceased to be given off, by inserting in the connection between the vacuum pan and the pump, a section of glass tubing which is kept cool. When condensation of escaping vapors upon the walls of the glass tube ceases the process may be considered complete. If the vacuum pan has glass covered ports so that the condition of the cement may be observed, the cessation of bubbling and a state of quiet fusion may be considered as indicating the completion of the reducing process.

The type of incandescent electric lamp shown in the accompanying drawing, is not the only one in which a cement improved by my novel process can be used. It may also be used in that type in which a glass stopper is fitted by grinding into the neck of the lamp, and rendered air tight by the use of a cement between the glass surfaces, or by a layer of cement flowed over the top of the stopper.

The gist of my invention consists in sealing air tight an incandescent electric lamp with a fusible cement which has been freed from volatile matter by being subjected to the reducing action of a vacuum at a temperature substantially higher than that of the neck of an operating lamp.

I claim—

1. In an incandescent lamp, the combination of a glass globe having a neck adapted to be closed air tight by a fusible cement; with a fusible cement, the materials composing which, have been freed from volatile matter by being exposed to a much reduced atmospheric pressure at a high temperature, substantially as and for the purpose set forth.

2. In an incandescent lamp, the combination of the glass globe M having a neck adapted to be closed by a fusible cement, the filament N and leading in wires O O: with the disk P and plug of fusible cement R, the materials composing said cement having been freed from volatile matter by exposure to a vacuum at a high temperature, substantially as and for the purpose set forth.

In testimony whereof I have signed my name to this specification, in the presence of two subscribing witnesses, on this 4th day of April, A. D. 1893.

WILLIAM EMERY NICKERSON.

Witnesses:
FRANK G. PARKER,
FRANK G. HATTIE.